United States Patent
Hashimoto et al.

(10) Patent No.: US 9,385,971 B2
(45) Date of Patent: Jul. 5, 2016

(54) COMMUNICATION SYSTEM AND NETWORK RELAY DEVICE

(71) Applicant: Hitachi Metals, Ltd., Minato-ku, Tokyo (JP)

(72) Inventors: Nozomi Hashimoto, Tsuchiura (JP); Wataru Kumagai, Ichikawa (JP)

(73) Assignee: Hitachi Metals, Ltd., Tokyo (JP)

( * ) Notice: Subject to any disclaimer, the term of this patent is extended or adjusted under 35 U.S.C. 154(b) by 97 days.

(21) Appl. No.: 14/139,018

(22) Filed: Dec. 23, 2013

(65) Prior Publication Data

US 2014/0226461 A1 Aug. 14, 2014

(30) Foreign Application Priority Data

Feb. 13, 2013 (JP) ................................ 2013-025977

(51) Int. Cl.
*H04L 12/939* (2013.01)
*H04L 12/709* (2013.01)

(52) U.S. Cl.
CPC ............ *H04L 49/557* (2013.01); *H04L 49/555* (2013.01); *H04L 45/245* (2013.01)

(58) Field of Classification Search
CPC ....... H04L 41/066; H04L 12/24; H04L 12/46; H04L 12/707; H04L 12/891; H04L 1/22
USPC ........................................................ 370/219
See application file for complete search history.

(56) References Cited

U.S. PATENT DOCUMENTS 6,560,236 B1 * 5/2003 Varghese et al. ............... 370/401
2008/0068985 A1 * 3/2008 Mieno .......................... 370/217

FOREIGN PATENT DOCUMENTS

JP 2008-78893 A 4/2008

* cited by examiner

*Primary Examiner* — Mohammad Anwar
*Assistant Examiner* — Kokou R Detse
(74) *Attorney, Agent, or Firm* — Crowell & Moring LLP

(57) ABSTRACT

In a multi-chassis link-aggregation device, each of first and second switch devices is provided with a relay condition, which defines prohibition of a predetermined relay path. If there is no link failure in each multi-chassis link-aggregation device, each of the first and second switch devices prohibits forwarding of a frame, which has been received by a bridge port, from each multi-chassis link-aggregation device. On the other hand, if a link failure is present in a second port (second multi-chassis link-aggregation device) of the first and second switch devices permits forwarding of the frame, which has been received by the bridge port, from the second port. In this case, if a destination port of the frame received by a first port includes the second multi-chassis link-aggregation device, the first switch device adds a port identifier representing the received port to the frame and forwards that toward the second switch device.

5 Claims, 13 Drawing Sheets

COMMUNICATION SYSTEM AND NETWORK RELAY DEVICE

CROSS-REFERENCE TO RELATED APPLICATION

The present application claims priority from Japanese Patent Application No. 2013-25977 filed on Feb. 13, 2013, the content of which is hereby incorporated by reference into this application.

TECHNICAL FIELD OF THE INVENTION

The present invention relates to a communication system and a network relay device. For example, the present invention relates to a network relay device in which link aggregation is set across two devices and a communication system including the network relay device.

BACKGROUND OF THE INVENTION

For example, Japanese Patent Application Laid-Open Publication No. 2008-78893 (Patent Document 1) describes a configuration provided with a pair of intermediate switch devices, which are connected to each other with redundancy ports, and a lower-level switch device and a higher-level switch device, which are connected to ports of the pair of intermediate switch devices having the same port numbers in a state in which link aggregation is set therefor.

SUMMARY OF THE INVENTION

For example, as a redundancy method, as shown in Japanese Patent Application Laid-Open No. 2008-78893, there is known a method in which two ports in a single switch device [A] are respectively connected to ports which are respectively in two switch devices [B] by communication lines. In this method, the single switch device [A] sets link aggregation with respect to the two ports of its own, and the two switch devices [B] also set link aggregation with respect to each of the ports across the devices.

In the redundancy method, different from general link aggregation in which a single switch device is physically set as a counterpart, the link aggregation is set across the two switch devices [B] while physically employing the two switch devices [B] as counterparts. Therefore, redundancy against failures of the switch devices can be realized in addition to effects obtained by general link aggregation such as redundancy against failures of communication lines and expansion of communication bands. In the present specification, the redundancy method in which the link aggregation is set across the two switch devices [B] in this manner will be referred to as multi-chassis link aggregation, and the two switch devices [B] will be referred to as multi-chassis link-aggregation devices.

In a switch device, the paths for relaying frames are desired to be limited in some cases from the viewpoint of security, etc. Specifically, in some cases, relaying of a frame from a predetermined relay-source port to a predetermined relay-destination port in a switch device is desired to be prohibited. Such a limitation on relaying can be realized, for example, by setting the predetermined relay-source and relay-destination ports described above as relay conditions in the switch device in advance. However, it has been found out by the studies of the present inventors that, in a case in which such relay conditions are set in the above-described multi-chassis link-aggregation device, if a link failure is present in any of the ports for which the multi-chassis link aggregation is set, a situation in which the desired relay conditions cannot be satisfied can occur.

The present invention has been made in view of such circumstances. It is a preferred aim of the present invention to achieve an improvement in fault tolerance by limiting paths upon relaying of frames in two network relay devices (switch devices) serving as multi-chassis link-aggregation devices even when a failure(s) occurs therein. It is another preferred aim of the present invention to achieve a communication system provided with the network relay devices. The above-described and other preferred aims and novel characteristics of the present invention will be apparent from the descriptions of the present specification and the accompanying drawings.

The typical ones of the inventions disclosed in the present application will be briefly described as follows.

A communication system according to an embodiment includes: first and second switch devices, each of the first and second switch devices having a plurality of ports including first and second ports and a bridge port, the first and second switch devices being connected to each other by a communication line via the bridge ports. In the communication system, each of the first and second switch devices has: a relay condition defining prohibition of relaying of a frame from a predetermined relay-source port to a predetermined relay-destination port among the plurality of ports; and a link table indicating that link aggregation is set for the first ports of the first and second switch devices and that link aggregation is set for the second ports of the first and second switch devices; if no link failure is present at the first and second ports, each of the first and second switch devices prohibits transfer of the frame, which has been received by the bridge port, from the first and second ports; if a link failure is present at the second port of the first switch device, the second switch device permits transfer of the frame, which has been received by the bridge port, from the second port; and the first switch device adds a port identifier representing the received port to the frame received by the first port and transfers the frame from the bridge port, and the second switch device detects the port identifier from the frame received by the bridge port and, if the relay-source port having the relay condition is the port represented by the port identifier, prohibits relaying of the frame toward the relay-destination port.

Effects obtained by typical embodiments of the invention disclosed in the present application will be briefly explained. Two network relay devices serving as multi-chassis link-aggregation devices can limit paths upon relaying of a frame even when a failure(s) occurs and achieve an improvement in fault tolerance.

BRIEF DESCRIPTIONS OF THE DRAWINGS

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference symbols throughout the drawings for describing the embodiments, and a repetitive description thereof is omitted.

First Embodiment

Brief Configuration of Communication System

Figure 1:
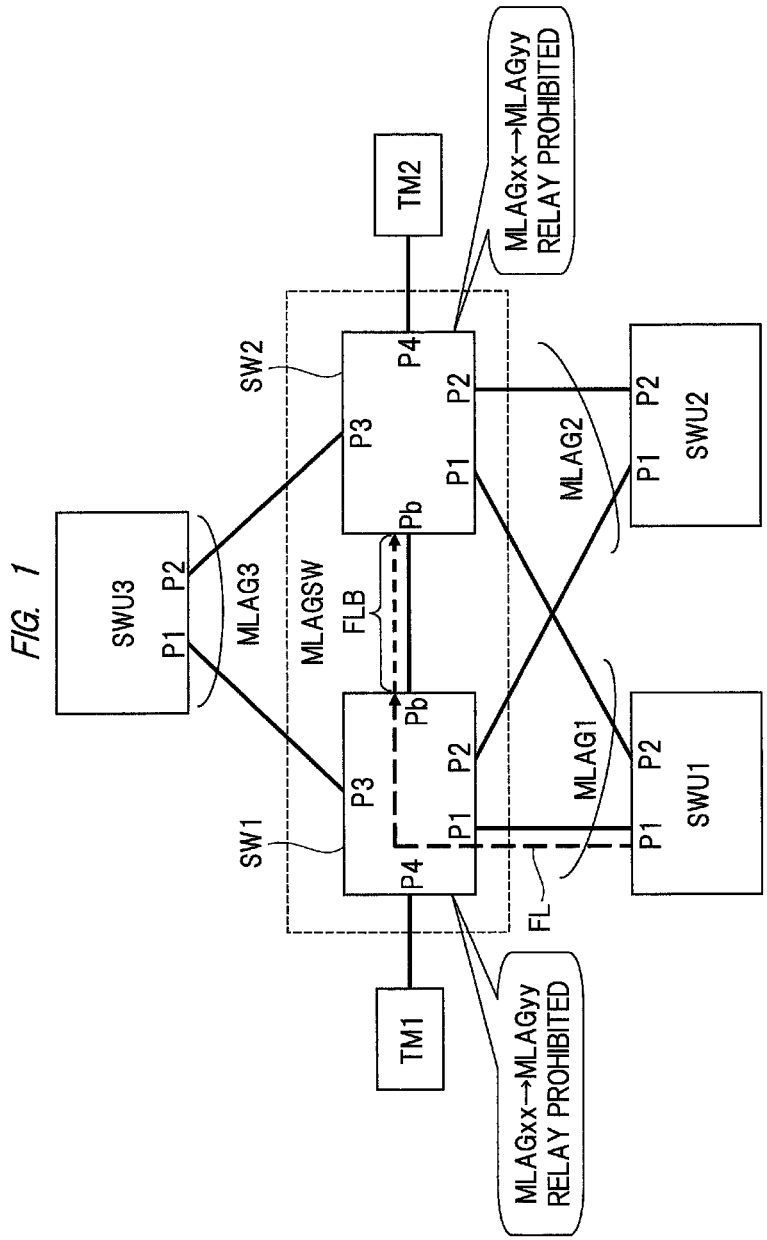
FIG. 1 is a schematic diagram showing a configuration example of a communication system according to a first embodiment of the present invention and an operation example of a main part thereof.

FIG. 1 is a schematic diagram showing a configuration example of a communication system according to a first embodiment of the present invention and an operation example of a main part thereof. The communication system shown in FIG. 1 is provided with two switch devices (network relay devices) SW1 and SW2 for which multi-chassis link aggregation is set, a plurality of (in this case, three) switch devices SWU1 to SWU3, and a plurality of terminals TM1 and TM2. Each of SW1 and SW2 is a box-type switch device. SW1 and SW2 constitute a multi-chassis link-aggregation device MLAGSW in the above-described manner.

Each of the switch devices (first and second switch devices) SW1 and SW2 has a plurality of (in this case, four) ports P1 to P4 and a bridge port Pb. SW1 and SW2 are connected to each other by a communication line (bridge communication line) via Pb.

Each of the switch devices SWU1 to SWU3 includes two ports P1 and P2. P1 and P2 of SWU1 are connected to the ports (first ports) P1 of SW1 and SW2 via mutually different communication lines, and link aggregation (multi-chassis link aggregation) is set for P1 and P2 serving as connection sources of the communication lines. P1 and P2 of SWU2 are connected to the ports (second ports) P2 of SW1 and SW2 via mutually different communication lines, and link aggregation (multi-chassis link aggregation) is set for P1 and P2 serving as connection sources of the communication lines. Similarly, P1 and P2 of SWU3 are connected to the ports (third ports) P3 of SW1 and SW2 via mutually different communication lines, and link aggregation (multi-chassis link aggregation) is set for P1 and P2 serving as connection sources of the communication lines.

In the present specification, the ports for which the multi-chassis link aggregation is set are referred to as MLAG ports (abbreviated as MLAG). The switch device SWU1 sets the ports P1 and P2 of its own as MLAG1, the switch device SWU2 sets the ports P1 and P2 of its own as MLAG2, and the switch device SWU3 sets the ports P1 and P2 of its own as MLAG3. MLAGSW sets the ports P1 of the switch devices SW1 and SW2 as MLAG1 in accordance with the setting of MLAG1 of SWU1 and causes the two ports P1 to logically (virtually) function as one port. Similarly, MLAGSW sets the ports P2 of SW1 and SW2 as MLAG2 in accordance with the setting of MLAG2 of SWU2, sets the ports P3 of SW1 and SW2 as MLAG3 in accordance with the setting of MLAG3 of SWU3, and causes each of the sets of the two ports P2 and the two ports P3 to logically (virtually) function as one port.

In FIG. 1, the port P4 of the switch device SW1 is connected to the terminal TM1, and the port P4 of the switch device SW2 is connected to the terminal TM2. The ports P4 of SW1 and SW2 are ports for which multi-chassis link aggregation is not set (in the present specification, referred to as general ports). Although illustration is omitted, each of SW1 and SW2 has a link table showing that link aggregation is set for each of the ports (first port to third port) P1 to P3 (in other words, P1 to P3 are set as MLAG1 to MLAG3, respectively).

<<Outlines and Problems of Communication System (Premise)>>

Before explaining operations of the communication system of FIG. 1, operations of a communication system studied as a premise of the communication system of FIG. 1 and an example of specific problems of a case in which the operations are used will be described with reference to FIG. 9 to FIG. 13.

Figure 9:
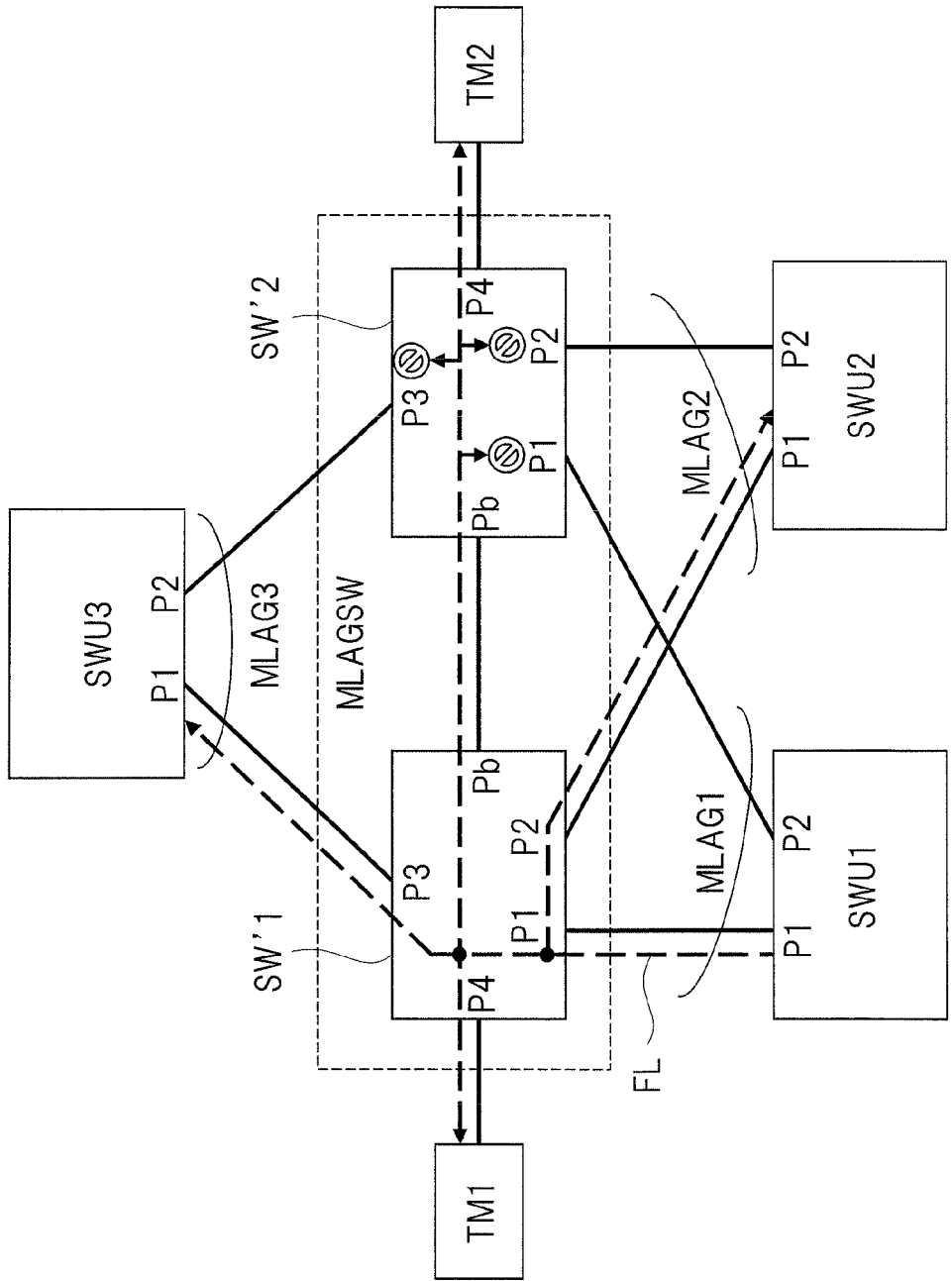
FIG. 9 is a schematic diagram showing a configuration example of a communication system studied as a premise of the present invention and an operation example of a case with no failure.

FIG. 9 is a schematic diagram showing a configuration example of the communication system studied as a premise of the present invention and showing an operation example of a case with no failure. The communication system of FIG. 9 has a configuration in which the switch devices SW1 and SW2 compose the multi-chassis link-aggregation device MLAGSW of the communication system of FIG. 1 are replaced by switch devices SW'1 and SW'2. As shown in FIG. 9, each of SW'1 and SW'2 carries out relaying of a frame between MLAG1 to MLAG3 by using P1 to P3 of its own if all the ports P1 to P3 of its own set as MLAG1 to MLAG3 are normal. In the example of FIG. 9, if SW'1 receives a frame FL of broadcast or multicast by the port P1 (MLAG1) of its own, SW'1 transfers this FL from the ports including the port P2 (MLAG2) of its own and the port P3 (MLAG3) of its own excluding the received port.

Along with this, the switch device SW'2 receives the frame FL by the bridge port Pb. In order to prevent redundant transfer of the frame FL from MLAG2 and MLAG3, which has already been carried out by the switch device SW'1, SW'2, the frame FL which has been received by Pb is transported from the port (in this case P4) excluding the received port and the ports P2 and P3 (MLAG2 and MLAG3) of its own. Furthermore, in order to prevent so-called returning of the frame, SW'2 prohibits transfer of FL from the port P1 (MLAG1) of its own. In this manner, each of SW'1 and SW'2 in MLAGSW has a function of prohibiting transfer of the frame, which has been received by Pb, from the MLAG ports of its own.

Figure 10:
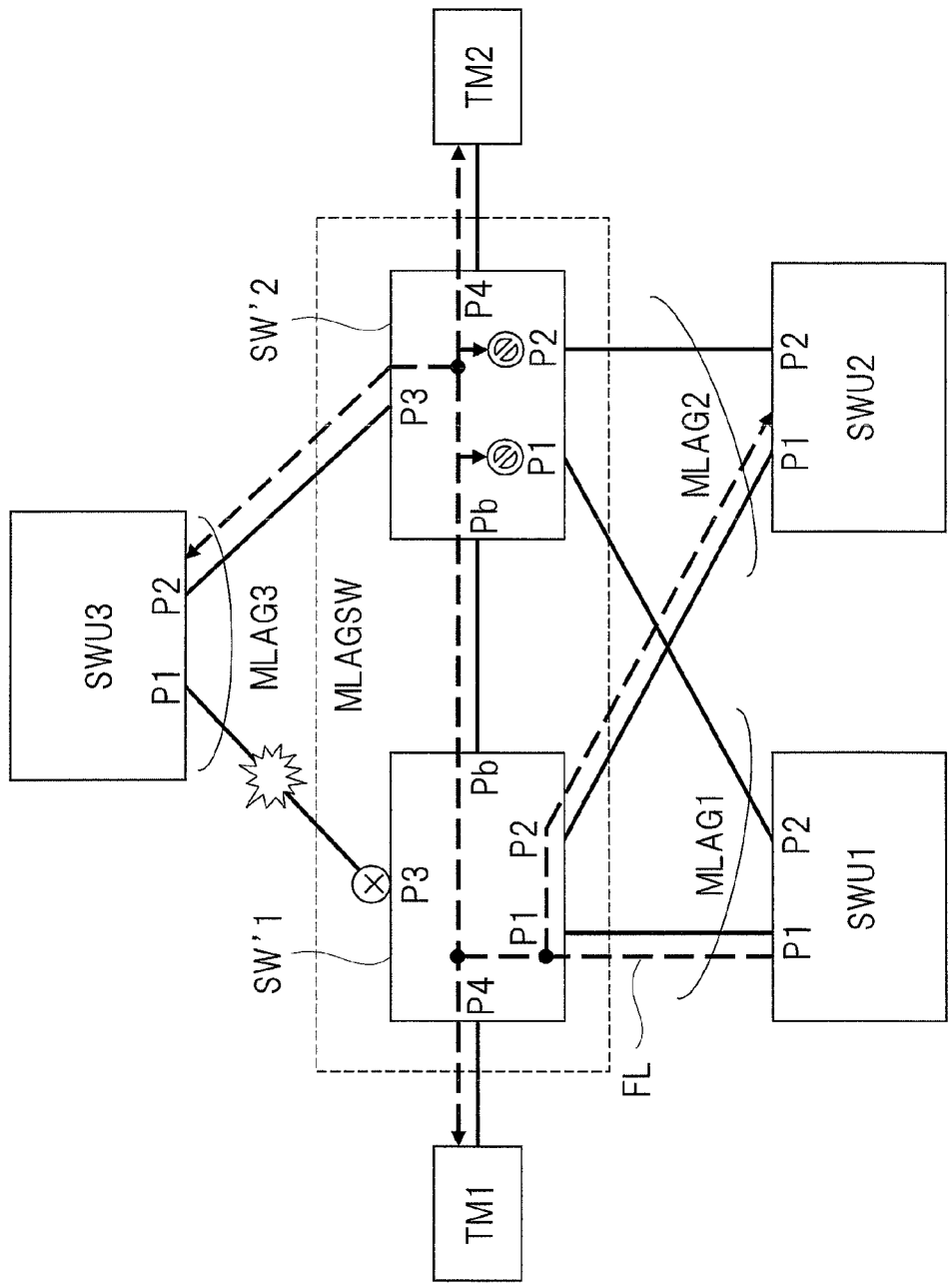
FIG. 10 is a schematic diagram showing an operation example of a case in which there is a failure in the communication system of FIG. 9.

FIG. 10 is a schematic diagram showing an operation example of a case in which there is a failure in the communication system of FIG. 9. In the example of FIG. 10, a link failure has occurred at the port P3, which has been set as the MLAG port (MLAG3), in one of the switch devices (in this case, SW'1) in MLAGSW. In other words, a failure has occurred in a link composed of P3 of SW'1, the port P1 of the switch device SWU3, and a communication line therebetween. In this case, in advance, the switch device SW'1 notifies the other switch device SW'2 via the bridge ports Pb that there is a link failure at the port P3 of its own set as MLAG3. Receiving this notification, SW'2 permits transfer of the frame FL, which has been received by Pb, from the port P3 of its own corresponding to MLAG3 in advance as an exception of the operation described in FIG. 9.

As shown in FIG. 10, when the switch device SW'1 receives the frame FL of broadcast or multicast by the port P1 (MLAG1) of its own on such a premise, the switch device SW'1 transfers the frame FL from the ports excluding the received port and the port P3 (MLAG3) of its own with the link failure. Along with this, the switch device SW'2 receives the frame FL by the bridge port Pb, transfers this frame FL from the port (in this case, P4) excluding the MLAG ports, and, in addition to that, transfers the frame FL also from the port P3 (MLAG3) which has been permitted to transfer the frame among the MLAG ports.

Figure 11:
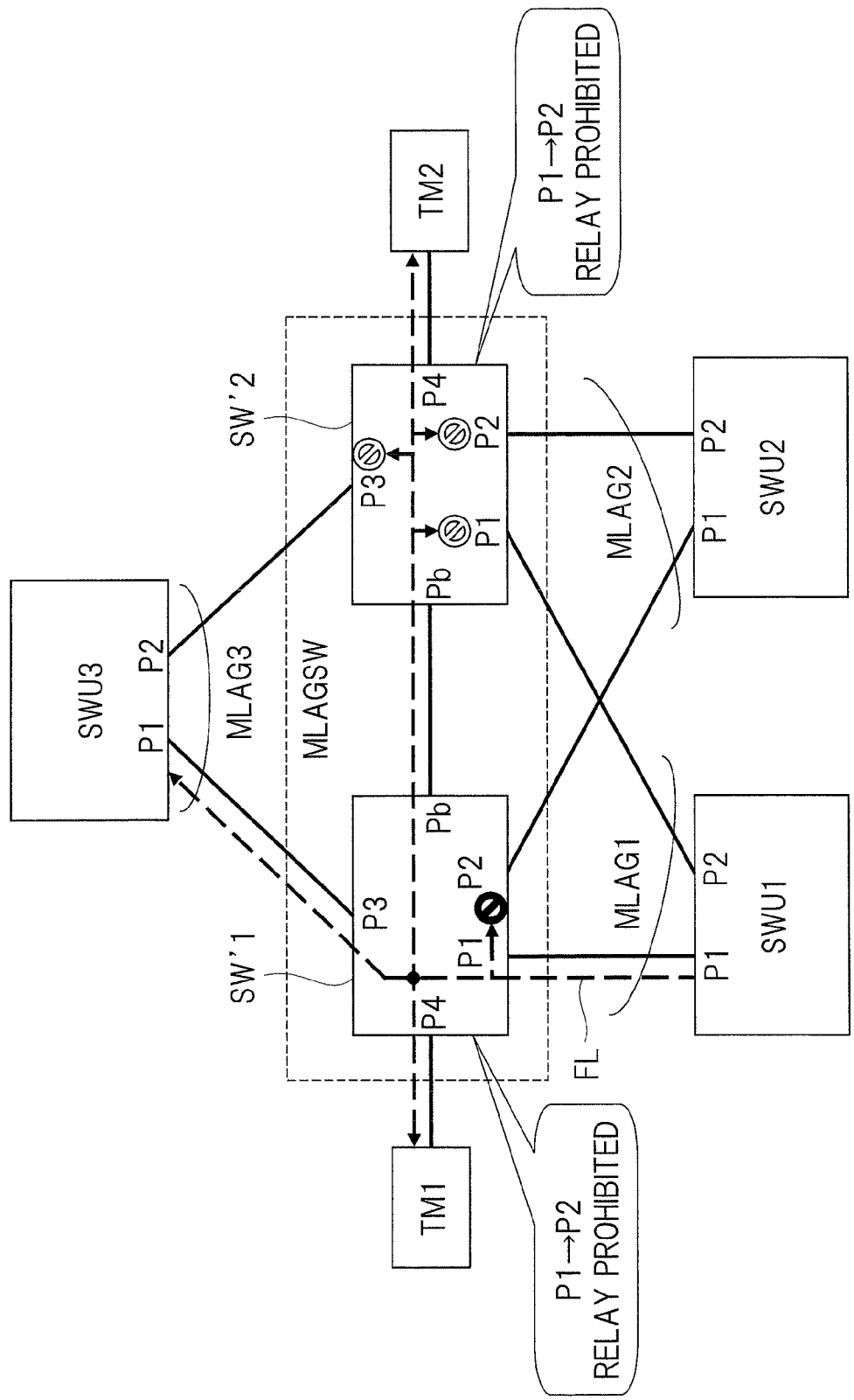
FIG. 11 is a schematic diagram showing an operation example of a case in which a relay condition is further set in the communication system of FIG. 9.

FIG. 11 is a schematic diagram showing an operation example of a case in which a relay condition is further set in the communication system of FIG. 9. As shown in FIG. 11, a relay condition(s) can be set in advance with respect to each of the switch devices SW'1 and SW'2 composing MLAGSW. The relay condition, for example, defines prohibition of relaying of the frame FL received by the port of a predetermined relay source to the port of a predetermined relay destination between the ports P1 to P3, which have been set as the MLAG ports (MLAG1 to MLAG3). In the example of FIG. 11, a relay condition is set for each of SW'1 and SW'2 to prohibit relaying from the port P1 of the relay source to the port P2 of the relay destination in advance.

In this case, for example, when the switch device SW'1 receives a frame FL of broadcast or multicast by the port P1 (MLAG1) of its own, the frame FL is transferred from the ports excluding the received port and the port P2 (MLAG2) of its own based on the relay condition of its own. As a result, the switch device SW'2 receives FL by the bridge port Pb; however, as described in FIG. 9, the transfer from the port P2 (MLAG2) of its own has been originally prohibited. Therefore, FL is not transferred from P2 (MLAG2) of SW'2, and the desired relay condition is satisfied. Although illustration is omitted, similarly, also for example when SW'2 receives a frame of broadcast or multicast by the port P1 (MLAG1) of its own under the relay condition set for SW'2 in advance, the desired relay condition is satisfied.

Figure 12:
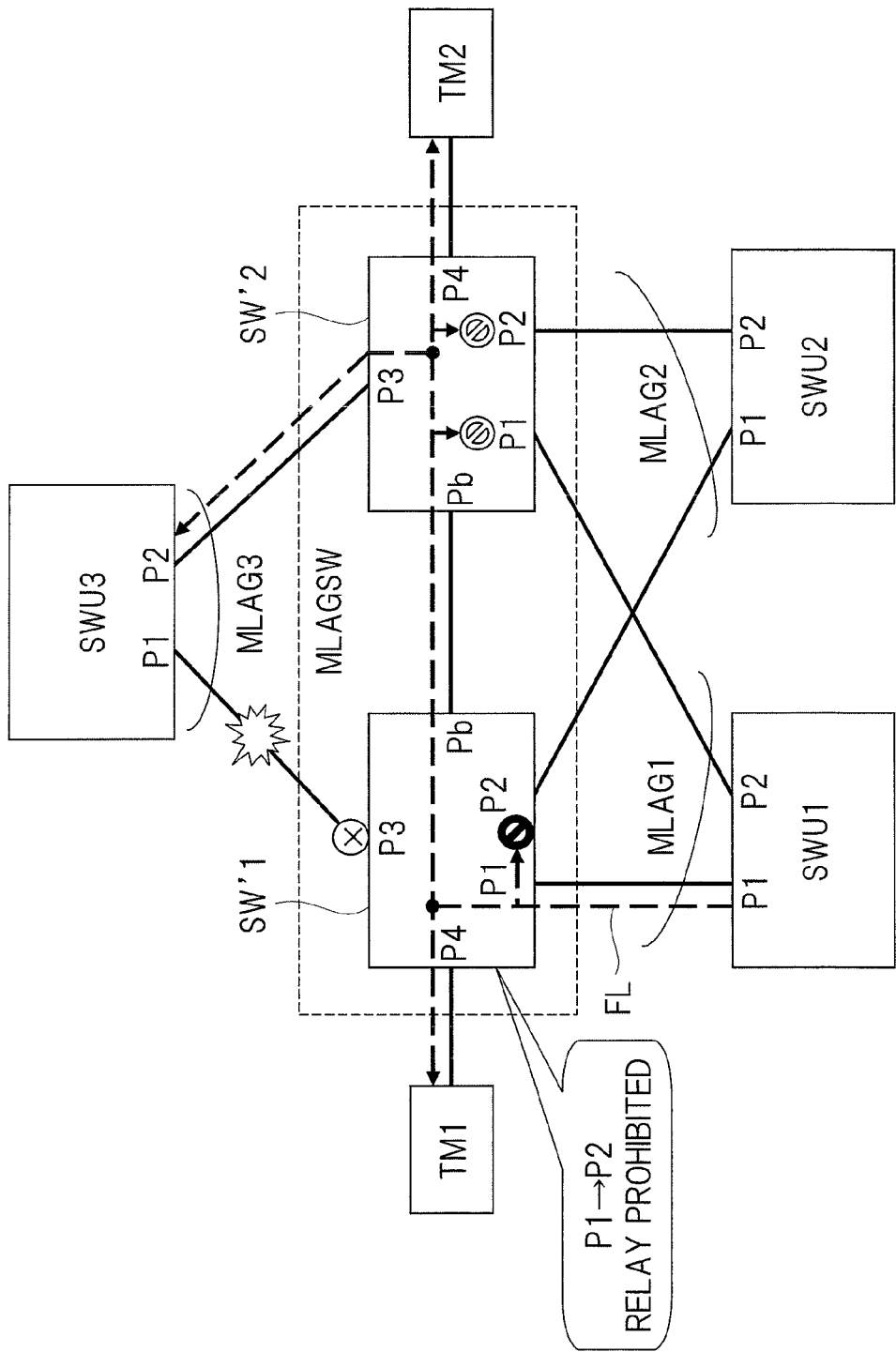
FIG. 12 is a schematic diagram showing an operation example of a case in which there is a failure in the communication system of FIG. 11.
Figure 13:
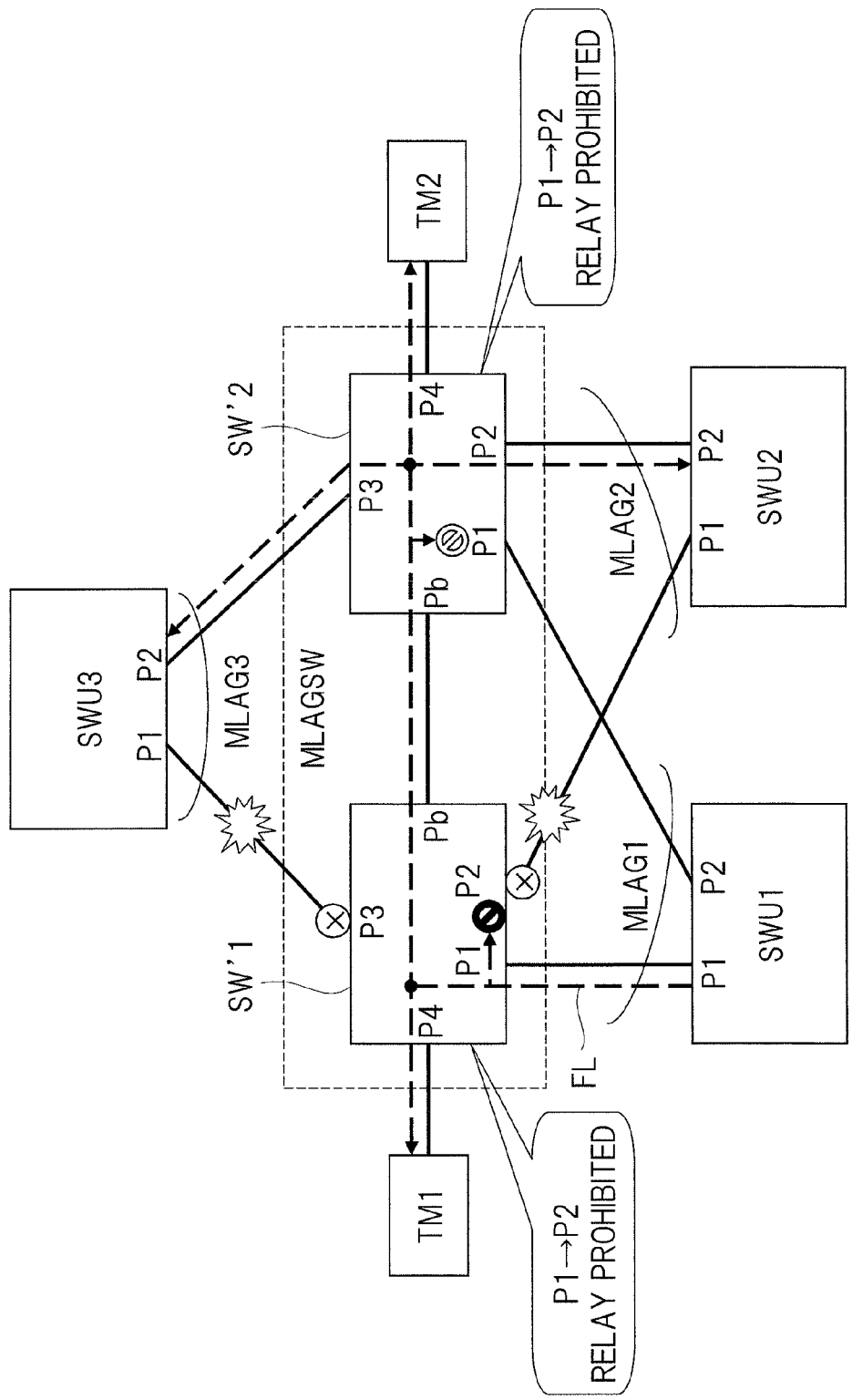
FIG. 13 is a schematic diagram showing an operation example of a case with failures different from those of FIG. 12 in the communication system of FIG. 11 and also is a drawing showing an example of a problem.

Note that such a relay condition is satisfied when all the MLAG ports owned by MLAGSW are normal, but are not satisfied in some cases when a link failure(s) is present at the MLAG port(s). FIG. 12 is a schematic diagram showing an operation example of a case in which a failure is present in the communication system of FIG. 11. FIG. 13 is a schematic diagram showing an operation example of a case in which failures different from that of FIG. 12 are present in the communication system of FIG. 11 and is a drawing showing the example of the problems.

As shown in FIG. 12, for example a case in which a link failure is present at the port P3 (MLAG3) of the switch device SW'1 is assumed. In this case, based on the relay condition that prohibits the relaying from the port P1 of the relay source set for its own to the port P2 of the relay destination, SW'1 does not transfer the frame FL of broadcast or multicast, which has been received by P1 (MLAG1), from P2 (MLAG2). As well as the case of FIG. 10, the switch device SW'2 transfers the frame FL, which has been received by the bridge port Pb, from the port P3 (MLAG3), which has been permitted as a result of the link failure, but does not transfer the frame from the port P2 (MLAG2). Therefore, as a result, the desired relay condition is satisfied.

However, as shown in FIG. 13, a case in which a link failure is also present furthermore at the port P2 (MLAG2) of the switch device SW'1, in addition to the case of FIG. 12, is assumed. In this case, the switch device SW'2 carries out the operation in the case of the failure as described with FIG. 10, thereby permitting the transfer from the port P2 of its own corresponding to the MLAG port (MLAG2) having a link failure. In this case, even if the relay condition to prohibit the relaying from the relay-source port P1 to the relay-destination port P2 is set with respect to SW'2, the relay condition does not match since the port of the relay source (in other words, the port which has received the frame) is the bridge port Pb when viewed from SW'2. As a result, the desired transfer condition is not satisfied.

Herein, the case in which a failure is present at the port P2 (MLAG2) in addition to the port P3 (MLAG3) of the switch device SW'1 is taken as an example. However, the desired relay condition is not satisfied also in the case in which P3 (MLAG3) of SW'1 does not have any failure and only the port P2 (MLAG2) has a failure. A case in which, on the premise that the link failures of FIG. 13 are present, if the frame received by the port P1 (MLAG1) of SW'1 is a frame of unicast of which a destination port is the port P2 (MLAG2) is assumed. In this case, the desired relay condition can be satisfied, for example, by carrying out an operation to cause SW'1 to discard the frame based on the relay condition of its own and stop transfer from the bridge port Pb. However, if the received frame is that of broadcast or multicast, transfer via the bridge port Pb occurs, and the desired relay condition therefore cannot be satisfied as shown in FIG. 13.

<<Brief Operations of Communication System>>

Therefore, in a communication system of FIG. 1, if no link failure is present at MLAG ports (MLAG1 to MLAG3) (in other words, first to third ports P1 to P3) as a premise, each of first and second switch devices SW1 and SW2 prohibits transfer of a frame, which is received by a bridge port Pb, from MLAG1 to MLAG3 (P1 to P3) as described with FIG. 9. Moreover, if a link failure is present at the MLAG port (for example, MLAG2 (second port P2)) of one of SW1 and SW2 (for example, SW1) as a premise, the other one of SW1 and SW2 (SW2) permits transfer of the frame, which has been received by Pb, from P2 (MLAG2) as well as the case of FIG. 10.

On such a premise, as shown in FIG. 1, when one of the first and second switch devices SW1 and SW2 (for example, SW1) receives a frame FL from the MLAG port (in this case, MLAG1 (port P1)) and transfers this FL from the bridge port Pb, the switch device generates a bridge frame FLB in which a port identifier representing the received port is added to this FL. SW1 transfers this FLB from Pb of its own to Pb of SW2.

Figure 2:
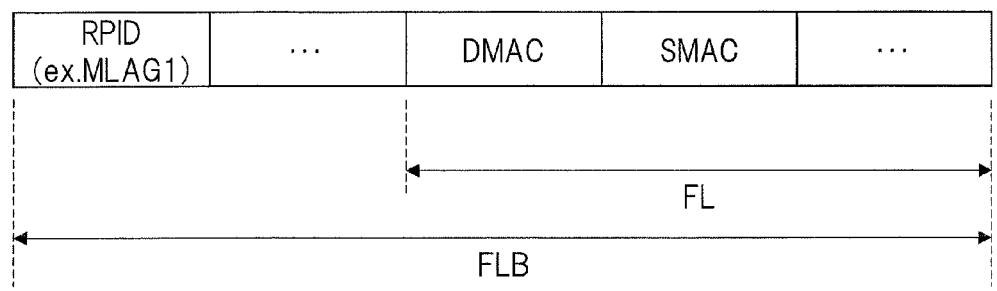
FIG. 2 is a schematic diagram showing a structure example of a bridge frame of FIG. 1.

FIG. 2 is a schematic diagram showing a structure example of the bridge frame FLB of FIG. 1. As shown in FIG. 2, for example, the frame FL received by the switch device SW1 by MLAG1 (first port P1) includes a transmission-source address (transmission-source MAC address) SMAC and a destination address (destination MAC address) DMAC. The bridge frame FLB has a structure in which the port identifier RPID representing the received port is added to this FL. For example, if SW1 receives FL by MLAG1 (P1), RPID is an identifier representing MLAG1 (P1).

Furthermore, in the communication system of FIG. 1, approximately as well as the case of FIG. 11, a relay condition(s) can be set in advance with respect to each of the first and second switch devices SW1 and SW2. The relay condition defines prohibition of relaying of a frame from the predetermined relay-source port (MLAGxx) to a predetermined relay-destination port (MLAGyy).

In this case, as shown in FIG. 1, if the bridge frame FLB including the port identifier RPID representing the received port (in this case, MLAG1) is transferred from the bridge port Pb of the first switch device SW1, first, the second switch device SW2 detects RPID from FLB received by Pb of its own. Then, SW2 determines that the relay-source port (MLAGxx) of the relay condition of its own is not Pb, but is the port represented by RPID (in this case, MLAG1) and carries out relaying of the frame FL so as to satisfy the relay condition of its own.

Specifically, if the relay-source port of the relay condition of its own is the port (in this case, MLAG1) represented by the port identifier RPID, the second switch device SW2 prohibits relaying of the frame to the relay-destination port. For example, if the relay-source port (MLAGxx) set by the relay condition of its own is MLAG1 and the relay-destination port (MLAGyy) is MLAG2, SW2 prohibits the relaying of the frame FL contained in the bridge frame FLB, which has been received by the bridge port Pb, to MLAG2 (port P2 of its own).

Figure 3:
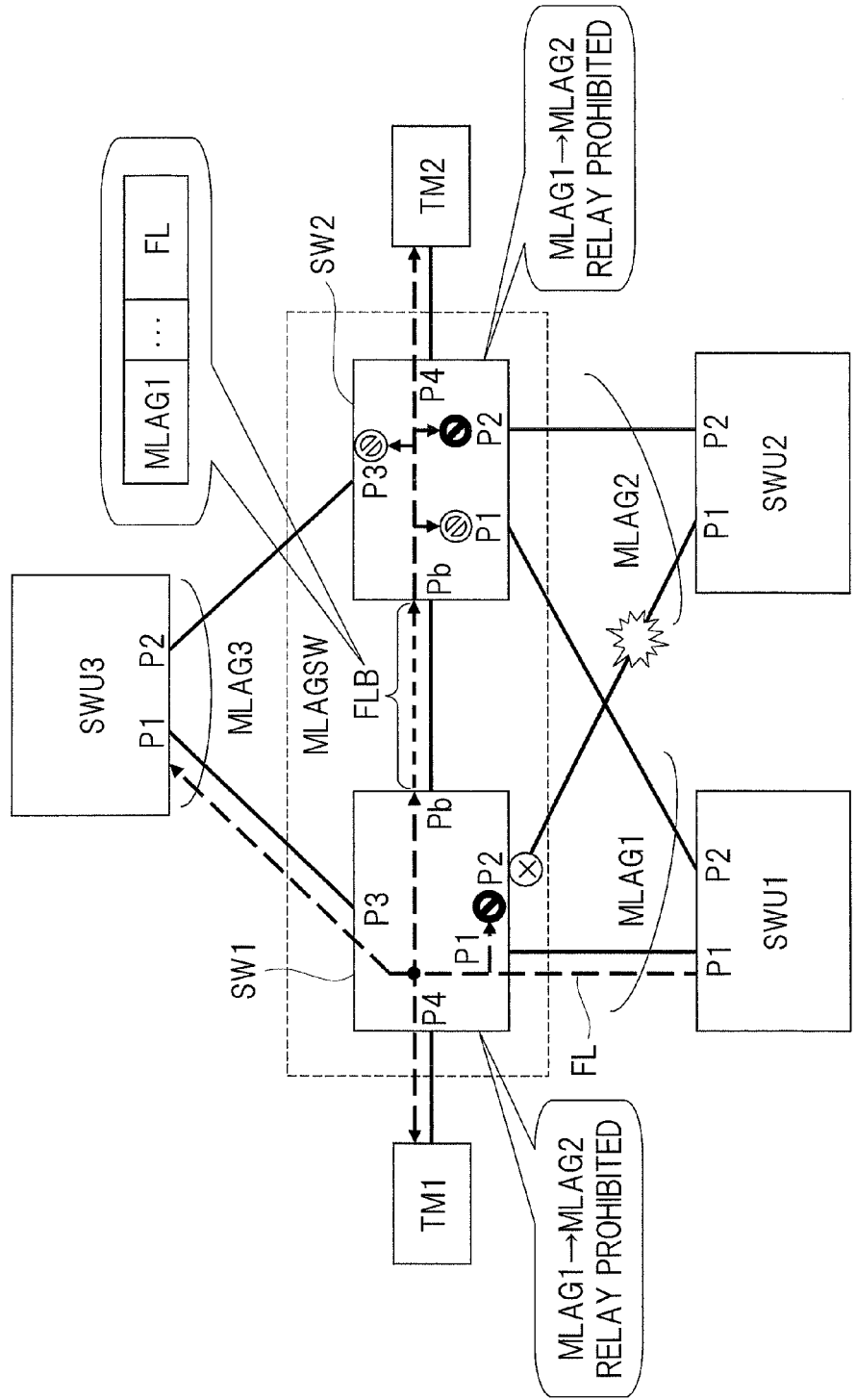
FIG. 3 is a schematic diagram showing an operation example of a case in which there is a failure in the communication system of FIG. 1.

FIG. 3 is a schematic diagram showing an operation example of a case in which there is a failure in the communication system of FIG. 1. FIG. 3 shows the operation example of the case in which a link failure is present at the second port P2 (MLAG2) of the first switch device SW1 in the communication system of FIG. 1. Moreover, in advance, each of the first and second switch devices SW1 and SW2 is provided with a relay condition which defines prohibition of relaying of a frame from a relay-source port (in this case, MLAG1) to a relay-destination port (in this case, MLAG2).

In this case, as shown in FIG. 3, if the first switch device SW1 receives a frame FL of broadcast or multicast by the port P1 (MLAG1) of its own, the first switch device SW1 generates a bridge frame FLB, in which a port identifier RPID (in this case, MLAG1) representing the received port is added to FL, and transfers this FLB from the bridge port Pb. Moreover, SW1 transfers the frame, which has been received by P1, also from the port P3 (MLAG3) and the port P4 of its own. In this process, SW1 generates FLB regardless of the presence/absence of the failure of the second port P2 (MLAG2) and transfers FLB from Pb. However, if there is such a premise that the second switch device SW2 is not required to carry out transfer from the general port P4, in some cases, SW1 may generate FLB only when there is a failure(s) at the MLAG port(s) of its own and transfer FLB from Pb.

On the other hand, in the second switch device SW2, in advance, in response to the link failure of the second port P2 (MLAG2) of the first switch device SW1, transfer of the frame, which has been received by the bridge port Pb, from the second port P2 (MLAG2) of its own is permitted. In this state, SW2 receives the bridge frame FLB by Pb. SW2 detects the port identifier RPID, which represents the received port, from this FLB and determines the relay-source port of the relay condition of its own is the port represented by this RPID (in this case, MLAG1). Then, if the relay-destination port of the relay condition of its own is not MLAG2 (P2), SW2 relays the frame FL contained in FLB toward P2 of its own. As a result, FL is transferred from P2.

In the example of FIG. 3, the ports of the relay source and the relay destination of the relay condition of the switch device SW2 are MLAG1 and MLAG2, respectively; therefore, based on the relay condition, SW2 prohibits the relaying toward P2 (MLAG2) of its own and prohibits the transfer from P2 (MLAG2). Moreover, the transfer from the port P1 (MLAG1) and the port P3 (MLAG3) of SW2 is also prohibited in advance by the operation as described with FIG. 9. As a result, SW2 transfers the frame FL, which is contained in the bridge frame FLB, only from the port P4.

When the operation like FIG. 3 is carried out by using the communication system of FIG. 1 in this manner, the desired relay condition can be satisfied, which is different from the case of FIG. 13. In FIG. 13, the link failure has further occurred also at the port P3 of the switch device SW1 compared with FIG. 3; however, in that case, simply, the transfer from P3 of SW1 in FIG. 3 is replaced by the transfer from P3 of SW2.

Moreover, FIG. 3 has described the case in which the frame FL is broadcasted or multicasted; however, for example, also in a case of unicast in which MLAG2 is a destination port, the relay condition can be satisfied by an operation similar to that of FIG. 3. Also, in the case of unicast, the relay condition can be satisfied by stopping the transfer from the bridge port Pb by SW1 based on the relay condition. Furthermore, the port identifier RPID in this case is, for example, MLAG1, but is not limited thereto as a matter of course; and, for example, if SW1 receives a frame by P1, the identifier is only required to be an identifier which means this P1. Both of SW1 and SW2 have recognized that multi-chassis link aggregation is set for P1 of both of them in advance; therefore, for example when SW2 receives the bridge frame FLB containing the identifier meaning P1, the relay condition can be determined by considering the frame as a frame received by P1 of its own.

As described above, by using the communication system of the first embodiment, even when a failure(s) occurs in the multi-chassis link-aggregation device MLAGSW, the paths upon relaying of a frame can be limited. More specifically, the function of prohibiting redundant transfer or returning of a frame as shown in FIG. 9 and the function(s) required as MLAGSW such as a function of ensuring a substitute path when a link failure occurs as shown in FIG. 10 are provided, and, furthermore, regardless of presence/absence of a link failure(s), the desired relay condition can be satisfied. As a result, the fault tolerance of the communication system can be improved.

Second Embodiment

In the above-described first embodiment, the operation examples of the case in which relaying of the frame between the MLAG ports is limited have been explained. However, relaying of the frame between the MLAG port and the general port can be also limited by using the port identifier RPID representing the received port as shown in FIG. 1. Hereinafter, details of that will be explained.

<<Brief Operations of Communication System (Application Example [1])>>

Figure 4:
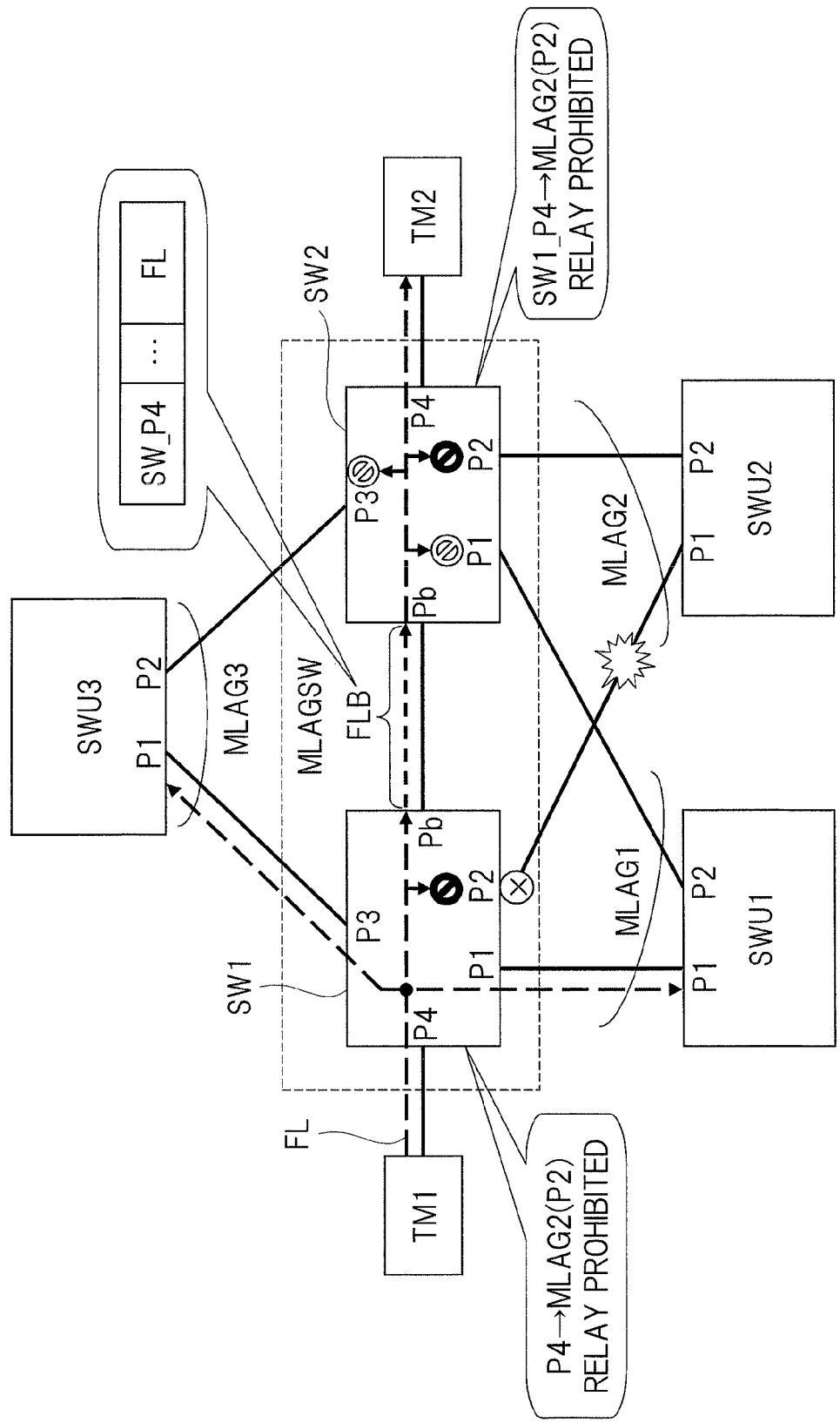
FIG. 4 is a schematic diagram showing a configuration example and an operation example of a communication system according to a second embodiment of the present invention.

FIG. 4 is a schematic diagram showing a configuration example and an operation example of a communication system according to a second embodiment of the present invention. The communication system of FIG. 4 is provided with a configuration similar to that of the communication system of FIG. 1 and FIG. 3, and a link failure is present at the second port P2 of the first switch device SW1. However, in FIG. 4, different from the case of FIG. 3, a frame FL of broadcast or multicast is received by the port (general port) P4 of SW1. Furthermore, herein, a case in which relaying of the frame from P4 of SW1 to the MLAG port (MLAG2) is desired to be prohibited is assumed.

In this case, the first switch device SW1 transfers the frame FL, which has been received by the port P4 of its own, from the port P1 (MLAG1) and the port P3 (MLAG3) of its own. Furthermore, SW1 generates a bridge frame FLB, in which a port identifier RPID representing the received port is added to FL, and transfers FLB from the bridge port Pb. RPID is an identifier representing the port P4 of SW1. In this process, regardless of the presence/absence of the failure of the second port P2 (MLAG2), SW1 generates FLB and transfers FLB from Pb. However, if there is such a premise that the transfer from the general port P4 of the second switch device SW2 is unnecessary, in some cases, SW1 may generate FLB only when there is a failure at the MLAG port of its own and transfer FLB from Pb.

On the other hand, in advance, in response to the link failure of the second port P2 (MLAG2) of the first switch device SW1, in the second switch device SW2, the transfer of the frame, which has been received by the bridge port Pb, from the second port P2 (MLAG2) of its own is permitted. In this state, SW2 receives the bridge frame FLB by Pb. SW2 detects the port identifier RPID, which represents the received port, from this FLB and determines the relay-source port of the relay condition of its own as the port (in this case, P4 of SW1) represented by this RPID.

Therefore, in advance, with respect to the second switch SW2, a relay condition that prohibits relaying of the frame from the relay-source port (in this case, P4 of SW1) to the relay-destination port (in this case, the second port P2 (MLAG2)) is determined. In this manner, in SW2, a situation that the frame, which has been received by the bridge port Pb, is transferred from the port P2 (MLAG2), which is permitted in response to the link failure, can be prevented. Also, transfer from the port P1 (MLAG1) and the port P3 (MLAG3) of SW2 is also prohibited in advance by the operation as described with reference to FIG. 9. As a result, SW2 transfers the frame FL, which is contained in the bridge frame FLB, only from the port P4 of its own. If the relay-destination port of the relay condition of its own is not MLAG2 (P2), SW2 transfers FL from P2 of its own.

<<Brief Operations of Communication System (Application Example [2])>>

Figure 5:
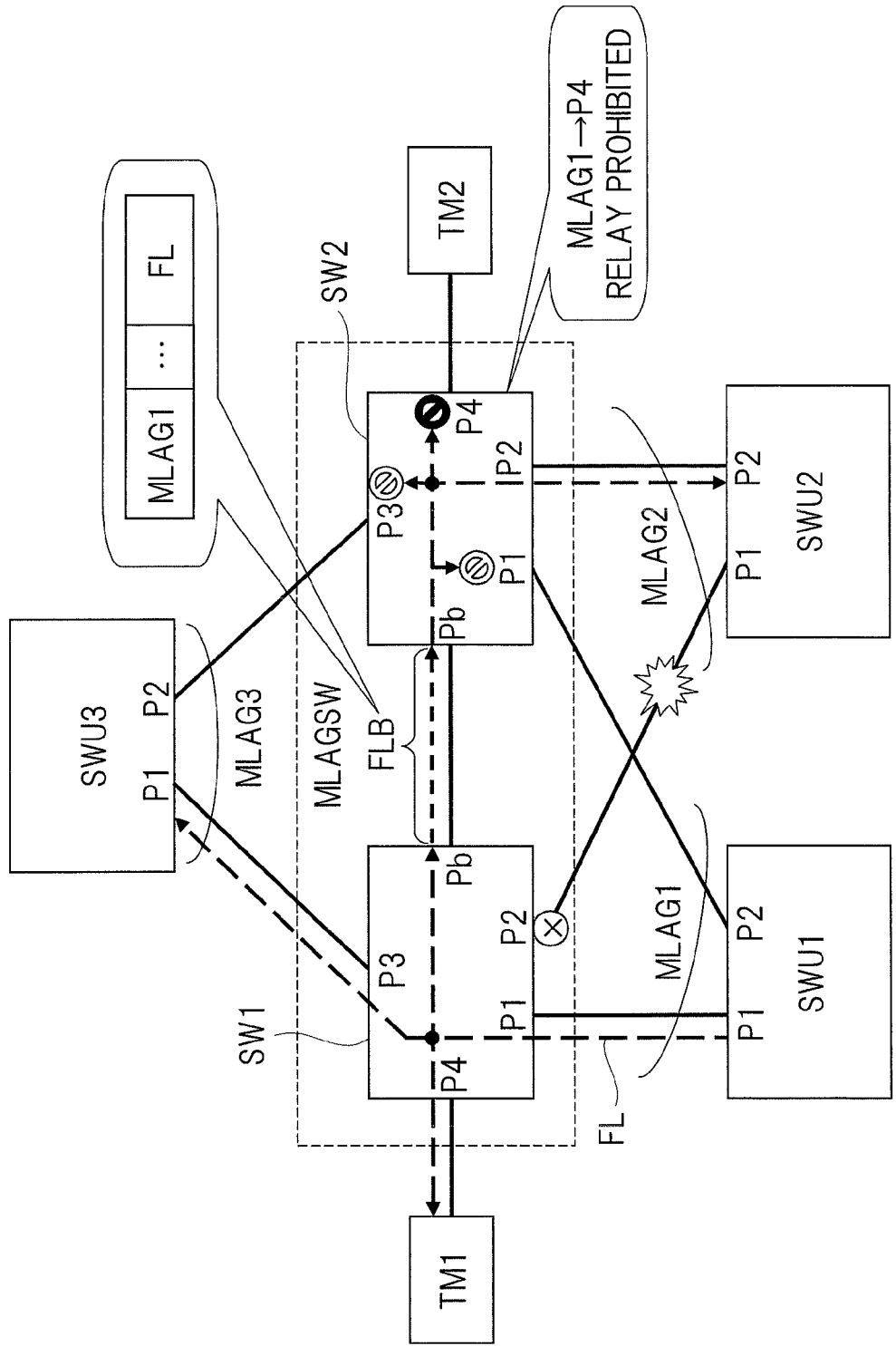
FIG. 5 is a schematic diagram showing a configuration example and another operation example of the communication system according to the second embodiment of the present invention.

FIG. 5 is a schematic diagram showing a configuration example and another operation example of the communication system according to the second embodiment of the present invention. The communication system of FIG. 5 is provided with a configuration similar to that of the communication system of FIG. 1 and FIG. 3, and a link failure is present at the second port P2 of the first switch device SW1. In this case, as well as the case of FIG. 3, the frame FL of broadcast or multicast is received by the first port P1 (MLAG1) of SW1. However, in this case, different from the case of FIG. 3, a case in which relaying of the frame from the MLAG port (MLAG1) to the port P4 of the switch device SW2 is desired to be prohibited is assumed.

In this case, the first switch device SW1 transfers the frame FL, which has been received by the port P1 (MLAG1) of its own, from the port P3 (MLAG3) and the port (general port) P4 of its own. Furthermore, SW1 generates a bridge frame FLB, in which a port identifier RPID representing the received port is added to FL, and transfers FLB from the bridge port Pb. RPID is an identifier representing MLAG1. In this process, regardless of the presence/absence of the failure at the second port P2 (MLAG2), SW1 generates FLB and transfers FLB from Pb. However, if there is such a premise that transfer from the general port P4 of the second switch device SW2 is unnecessary, in some cases, SW1 may generate FLB only when there is a failure at the MLAG port of its own and transfer FLB from Pb.

On the other hand, in the second switch device SW2, in advance, in response to the link failure of the second port P2 (MLAG2) of the first switch device SW1, transfer of the frame, which has been received by the bridge port Pb, from the second port P2 (MLAG2) of its own is permitted. In this state, SW2 receives the bridge frame FLB by Pb. SW2 detects the port identifier RPID, which represents the received port, from this FLB and determines the relay-source port of the relay condition of its own as the port (in this case, MLAG1) represented by this RPID.

Therefore, in advance, with respect to the second switch SW2, a relay condition that prohibits relaying of the frame from the relay-source port (in this case, MLAG1) to the relay-destination port (in this case, the port (general port) P4) is determined. By virtue of this, in SW2, a situation that the frame, which has been received by the bridge port Pb, is transferred from the port (general port) P4 can be prevented. Also, transfer from the port P1 (MLAG1) and the port P3 (MLAG3) of SW2 is also prohibited in advance by the operation as described with FIG. 9. As a result, SW2 transfers the frame FL, which is contained in the bridge frame FLB, only from the port P2 (MLAG2) of its own.

When the port identifier RPID representing the received port is used in the above-described manner, regardless of the presence/absence of the link failure, the paths including the general port upon relaying of the frame can be limited. Note that, herein, the case in which the relaying of the frame between the MLAG port and the general port is limited has been explained; however, relaying of the frame between the general ports (for example, P4 of SW1 and P4 of SW2) can be similarly limited by setting RPID as the general port as shown in FIG. 4.

Third Embodiment

In a third embodiment, main configuration examples and operation examples of the switch devices (network relay devices) SW1 and SW2 constituting the multi-chassis link-aggregation device MLAGSW in the communication systems of the first and second embodiments will be described.

<<Brief Configuration of Switch Devices (Network Relay Devices)>>

Figure 6A:
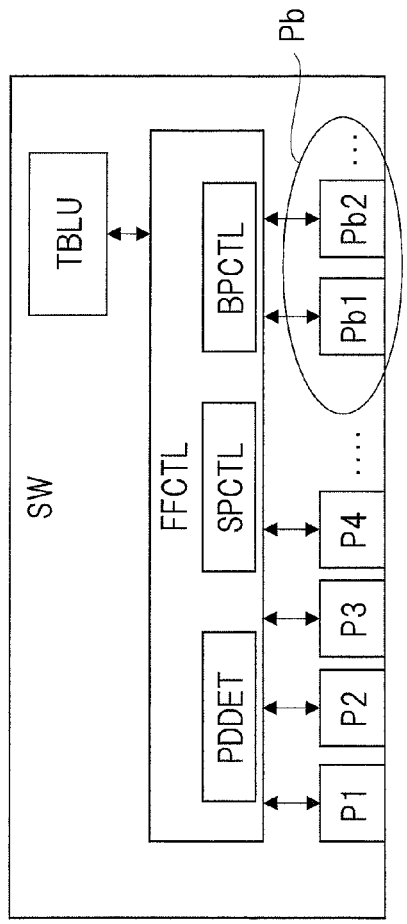
FIG. 6A is a block diagram showing a schematic configuration example of a main part of a network relay device according to a third embodiment of the present invention.
Figure 6B:
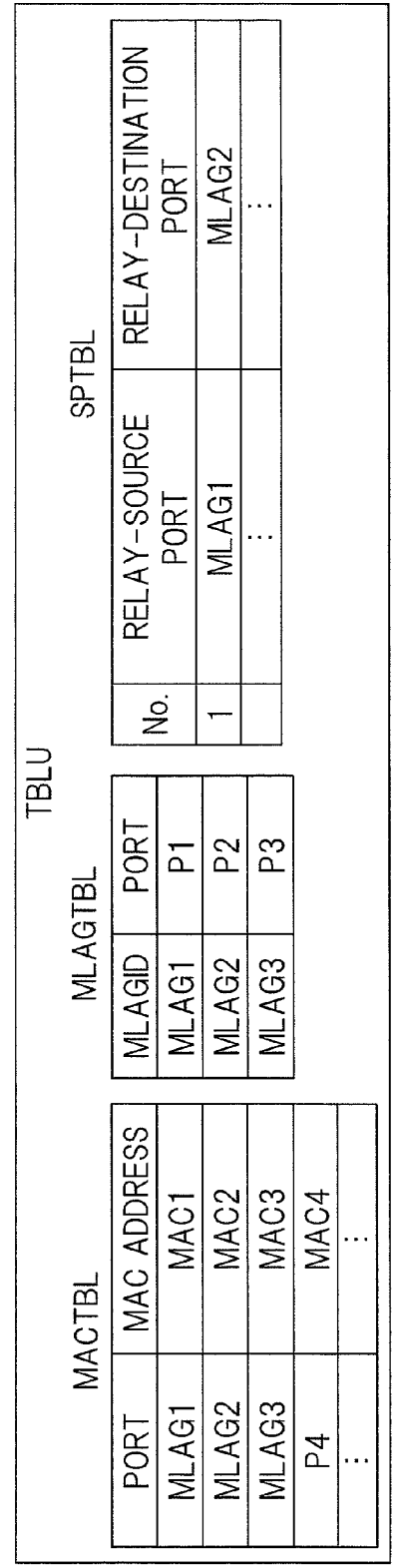
FIG. 6B is a schematic diagram showing a configuration example of a table unit of FIG. 6A.

FIG. 6A is a block diagram showing a schematic configuration example of a main part of the network relay device according to the third embodiment of the present invention, and FIG. 6B is a schematic diagram showing a configuration example of a table unit in FIG. 6A. The switch device (network relay device) SW shown in FIG. 6A is provided with, for example, a frame-forwarding control unit FFCTL, the table unit TBLU, and the plurality of ports (P1, P2, P3, P4, and so on, Pb1, Pb2, and so on). Among them, Pb1, Pb2, and so on are corresponding to the bridge ports Pb shown in FIG. 1. Herein, in order to ensure redundancy and a band, the plurality of bridge ports Pb1, Pb2, and so on are provided, and link aggregation is set for Pb1, Pb2, and so on.

For example, if the switch device SW1 of FIG. 1 is taken as an example, the switch devices SWU1, SWU2, and SWU3 are connected to the ports P1, P2, and P3, respectively via communication lines, and the terminal TM1 is connected to the port P4 via a communication line. Moreover, the switch device SW2 is connected to the bridge port Pb via the communication line (bridge communication line). In the table unit TBLU, relay conditions (relay condition setting table) SPTBL is retained in addition to an address table MACTBL, a link table MLAGTBL, etc.

The address table MACTBL retains the relations between the ports (the general ports and the MLAG ports) and MAC (Media Access Control) addresses of the terminals, etc. present at tips of the ports. MACTBL is used when a destination port is determined with respect to a received frame. The link table MLAGTBL retains the relations between the ports and link aggregation (multi-chassis link aggregation). This example shows that link aggregation is set for each of the first port P1 to the third port P3 (in other words, P1 to P3 are set as MLAG1 to MLAG3, respectively). The relay conditions (the setting table of relay conditions) SPTBL define prohibition of relaying of frames from the predetermined relay-source port to the predetermined relay-destination port as described above. In this example, it defines prohibition of relaying of frames from the MLAG port (MLAG1) to the MLAG port (MLAG2).

The frame-forwarding control unit FFCTL includes a port-failure detecting unit PDDET, a relay-condition processing unit SPCTL, and a bridge-port processing unit BPCTL. Schematically, based on the table unit TBLU, FFCTL carries out building of relay paths for transferring frames between the ports (P1, P2, P3, P4, and so on, Pb), determination of a destination port based on the received frame, update of the address table MACTBL, etc.

In this process, the port-failure detecting unit PDDET detects a link failure(s) of the ports (P1, P2, P3, P4, ..., Pb). The relay-condition processing unit SPCTL prohibits relaying of frames via a particular relay path(s) based on the relay conditions (the setting table of the relay conditions) SPTBL. As described above, the bridge-port processing unit BPCTL carries out generation and transmission of the bridge frame FLB and analysis of received FLB. Furthermore, BPCTL carries out a process of transmitting the information of the port, for which a link failure has been detected by PDDET, from the bridge port Pb by using a control frame, a reverse process of recognizing the port, for which the link failure has been detected, from the control frame received by Pb, etc.

<<Operations of Switch Devices (Network Relay Devices)>>

Figure 7:
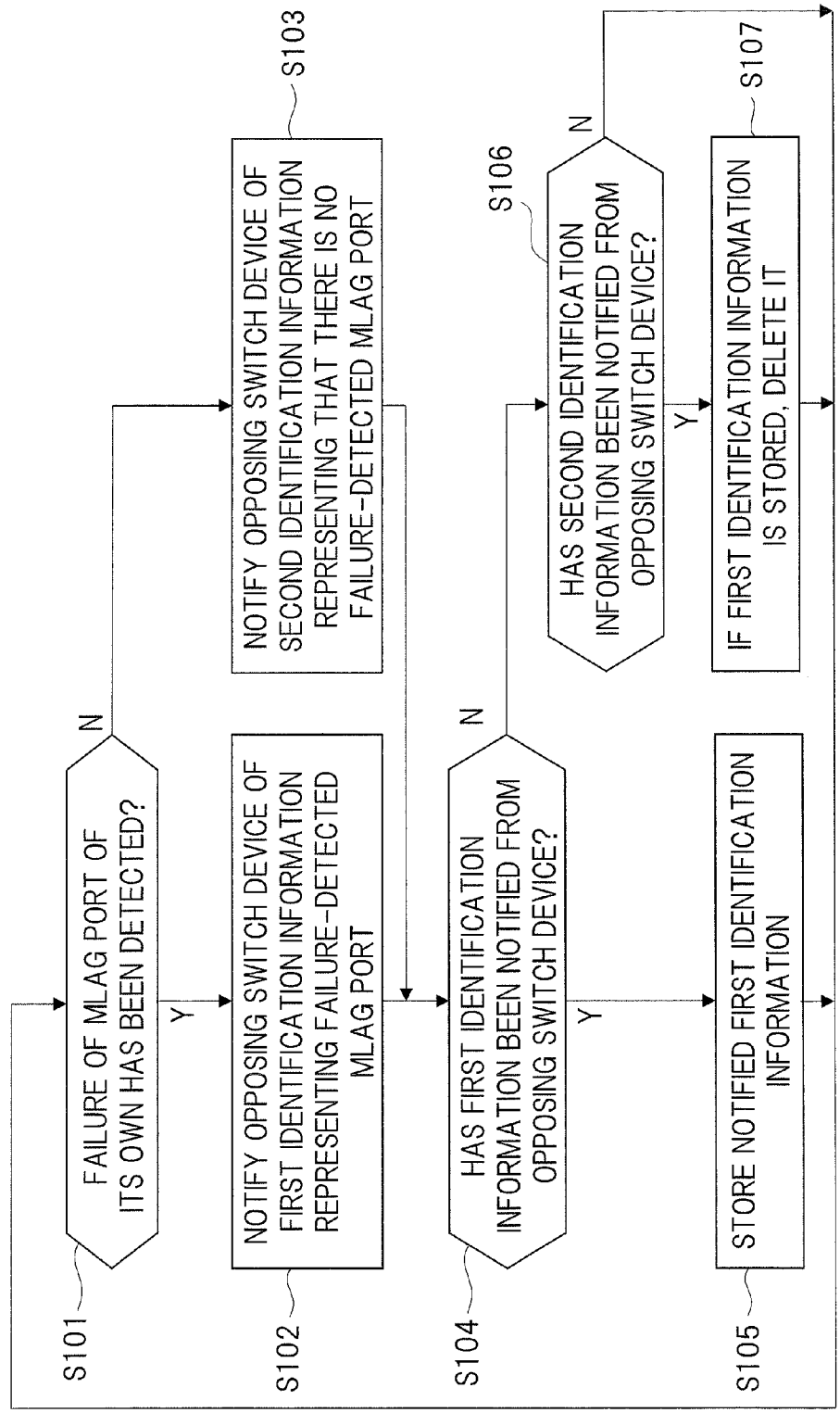
FIG. 7 is a flow chart showing a main operation example of the network relay device of FIG. 6A and FIG. 6B.
Figure 8:
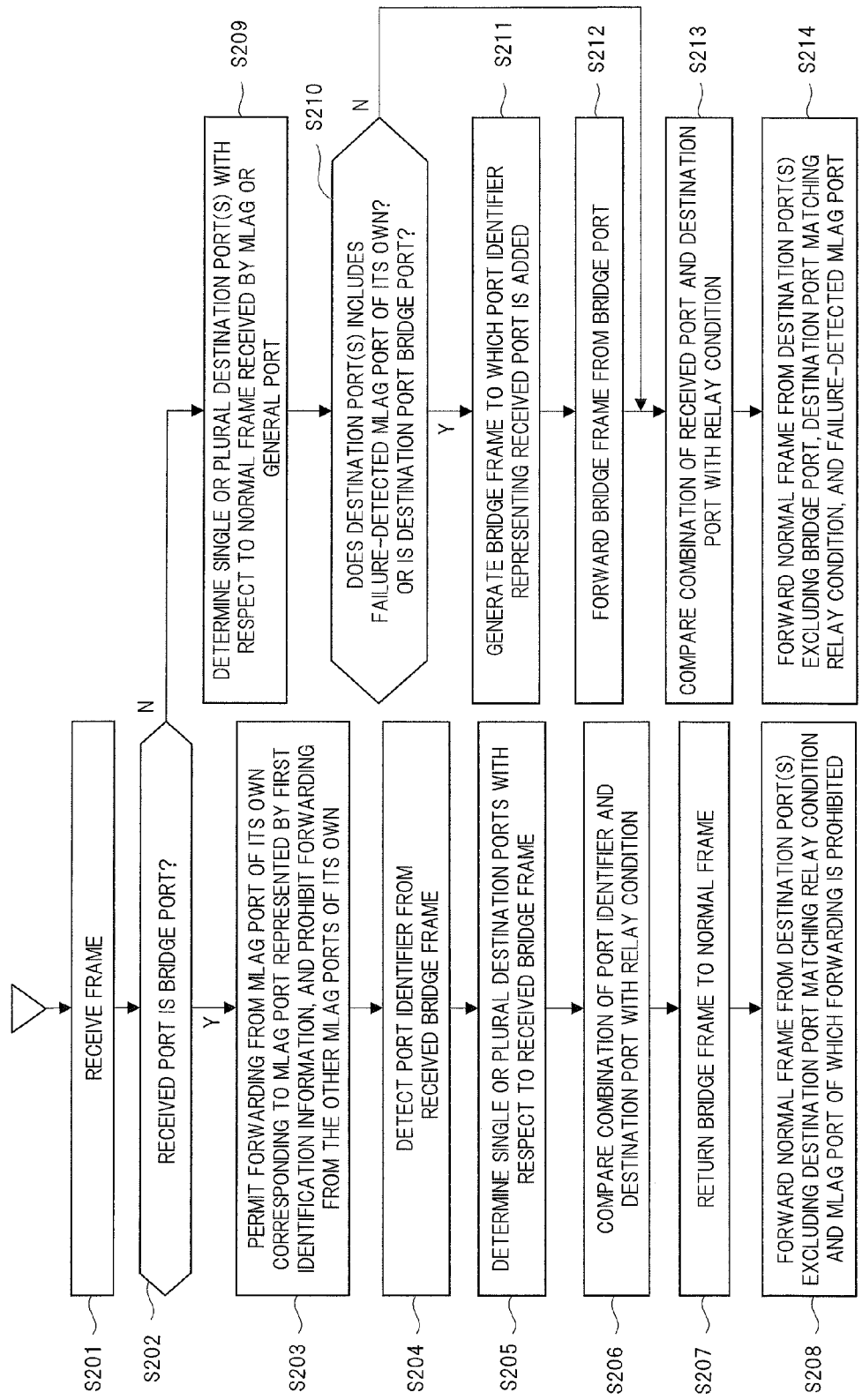
FIG. 8 is a flow chart showing a main operation example of the network relay device of FIG. 6A and FIG. 6B.

FIG. 7 and FIG. 8 are flow charts showing main operation examples of the network relay devices of FIG. 6A and FIG. 6B. FIG. 7 mainly shows processing contents of a process in which the information of the port(s) at which a link failure(s) is detected is shared among MLAGSW by using the port-failure detecting unit PDDET and the bridge-port processing unit BPCTL. FIG. 8 mainly shows processing contents of a process in which a relay path(s) of a frame is controlled based on the state of the link failure(s) and the relay conditions (the setting table of relay conditions) SPTBL by using the relay-condition processing unit SPCTL and the port-failure detecting unit PDDET.

In FIG. 7, first, the frame-forwarding control unit FFCTL (port-failure detecting unit PDDET) monitors the MLAG ports of its own and, if there is a link failure(s), detects that (step S101). If a link failure is detected at this point, FFCTL (bridge-port processing unit BPCTL) notifies the opposing switch device (network relay device) in the same MLAGSW of first identification information, which represents the MLAG port at which the link failure has been detected, via the bridge port Pb (step S102) and makes a transition to step S104. On the other hand, if no link failure is detected in step S101, FFCTL (BPCTL) notifies the opposing switch device of second identification representing that fact (step S103) and makes a transition to step S104.

In step S104, FFCTL (bridge-port processing unit BPCTL) determines whether FFCTL has been notified of first identification information from the opposing switch device or not. If the first identification information has been notified, FFCTL (BPCTL) stores the first identification information in the table unit TBLU, etc. (step S105) and returns to step S101. On the other hand, if no first identification information has been notified, FFCTL (BPCTL) determines whether FFCTL has been notified of second identification information from the opposing switch device or not (step S106). If the second identification information has been notified, and if the first identification is stored, FFCTL (BPCTL) deletes it (step S107) and returns to step S101. This means that the link failure of the opposing switch device has been recovered. On the other hand, if no second identification information has been notified in step S106, FFCTL returns to step S101.

For example, by periodically executing the process of steps S101 to S107 in the manner as shown in FIG. 7, the state of link failures of the MLAG ports of its own can be periodically monitored, and the state of link failures of the MLAG ports of the opposing switch device can be periodically obtained. The processing contents of FIG. 7 are only required to be the processing contents by which the state of link failures can be shared between MLAGSW, and the processing contents are not limited to those of FIG. 7 and can be variously changed.

In FIG. 8, first, the frame-forwarding control unit FFCTL receives a frame (step S201). Then, FFCTL determines whether the port which has received the frame is the bridge port Pb or not (step S202). If the port which has received the frame is Pb, FFCTL permits transfer from the MLAG port of its own corresponding to the MLAG port represented by the first identification information shown in FIG. 7 (more specifically, the MLAG port having a link failure in the opposing switch device) and prohibits transfer from the other MLAG ports of its own (step S203).

Subsequently, the frame-forwarding control unit FFCTL (bridge-port processing unit BPCTL) detects the port identifier RPID from the received bridge frame FLB (step S204). Then, FFCTL determines a single or a plurality of destination ports for FLB (step S205). For example, if the frame FL in FLB is to be broadcasted or multicasted, the ports other than the received port (in this case, the bridge port Pb) are determined as destination ports; and, if FL is to be unicasted, a single destination port is determined based on, for example, the address table MACTBL.

Subsequently, the frame-forwarding control unit FFCTL (relay-condition processing unit SPCTL) determines that the port represented by the port identifier RPID detected in step S204 is a relay-source port, considers the destination port(s) determined in step S205 as a relay-destination port, and compares that combination with the relay condition (the setting table of the relay conditions) SPTBL (step S206). Then, FFCTL returns the bridge frame FLB to the normal frame FL (step S207). Then, FFCTL transfers the normal frame FL from the destination port(s) excluding the destination port which matches the relay condition in step S206 and the MLAG ports of which transfer has been prohibited in step S203 (step S208).

On the other hand, if the received port is not the bridge port Pb in step S202, the frame-forwarding control unit FFCTL determines a single or a plurality of destination ports with respect to the frame (normal frame) received by the MLAG or general port of its own (step S209). For example, if the received frame FL is to be broadcasted or multicasted, the ports other than the received port is determined as destination ports; and, if FL is to be unicasted, a single destination port is determined based on the address table MACTBL.

Subsequently, the frame-forwarding control unit FFCTL determines whether the determined destination port(s) includes the MLAG port(s) of its own for which a link failure has been detected by the port-failure detecting unit PDDET of its own. Moreover, FFCTL determines whether the determined destination port(s) includes the bridge port Pb or not (more specifically, for example, whether forwarding from the general port P4 of the opposing switch device SW2 is needed like FIG. 5 or not) (step S210). If the determined destination port(s) includes the MLAG port having a link failure or includes Pb, FFCTL (bridge-port processing unit BPCTL) generates the bridge frame FLB to which the port identifier RPID representing the received port is added (step S211). Then, FFCTL (BPCTL) forwards this FLB from Pb (step S212) and makes a transition to step S213.

On the other hand, if the determined destination port(s) does not include the MLAG port having a link failure and also does not include the bridge port Pb in step S210, the frame-forwarding control unit FFCTL makes a transition to step S213. In step S213, FFCTL (relay-condition processing unit SPCTL) determines that the received port is the relay-source port, considers the destination port(s) determined in step S209 as a relay-destination port, and compares that combination with the relay conditions (the setting table of relay conditions) SPTBL. Then, FFCTL forwards the normal frame FL from the destination port(s) excluding the bridge port Pb, the destination port which matches the relay condition in step S213, and the MLAG port of its own having a link failure (step S214).

In the foregoing, the invention made by the inventors of the present invention has been explained in detail based on the embodiments. However, the present invention is not limited to the above-described embodiments, and various modifications can be made within a range not departing from the gist thereof. For example, the above-described embodiments have been explained in detail in order to understandably explain the present invention and are not necessarily limited to be provided with all of the explained components. Part of the components of a certain one of the embodiments can be replaced by the components of another one of the embodiments, and the components of a certain one of the embodiments can additionally have the component(s) of another one of the embodiments. Part of the components of each of the embodiments can be subjected to addition/deletion/replacement with the other components.

For example, in the above-described embodiments, mainly, the switch devices (network relay devices) of a layer 2 (L2) level are taken as examples for description. However, as a matter of course, the invention can be similarly applied also in a case of switch devices (network relay devices) of a layer 3 (L3) level.

What is claimed is:

1. A communication system comprising:
   first and second switch devices, each of the first and second switch devices having a plurality of ports including first and second ports and a bridge port, the first and second switch devices being connected to each other by a communication line via the bridge ports;
   wherein each of the first and second switch devices has:
      a relay condition defining prohibition of relaying of a frame from a predetermined relay-source port to a predetermined relay-destination port among the plurality of ports; and
      a link table indicating that link aggregation is set for the first ports of the first and second switch devices and that link aggregation is set for the second ports of the first and second switch devices;
   if no link failure is present at the first and second ports, the first switch device prohibits forwarding of the frame, which has been received by the bridge port of the second switch device, from the first and second ports, and the second switch device prohibits forwarding of the frame, which has been received by the bridge port of the first switch device, from the first and second ports;
   if a link failure is present at the second port of the first switch device, the second switch device permits forwarding of the frame, which has been received by the bridge port of the second switch device, from the second port of the second switch device; and
   the first switch device adds a port identifier to the frame, which is received by the first port of the first switch device, the port identifier representing a port of the plurality of ports of the first switch device that received the frame, and forwards the frame from the bridge port of the first switch device to the bridge port of the second switch device, and the second switch device detects the port identifier from the frame received by the bridge port of the second switch device and, if the relay-source port having the relay condition is the port represented by the port identifier, prohibits relaying of the frame toward the relay-destination port.

2. The communication system according to claim 1,
   wherein the plurality of ports owned by each of the first and second switch devices further include a general port for which link aggregation is not set; and
   the first switch device adds the port identifier representing the received port to the frame received by the general port and forwards the frame from the bridge port of the first switch device to the bridge port of the second switch device, and the second switch device detects the port identifier from the frame received by the bridge port of the second switch device and, if the relay-source port having the relay condition is the port represented by the port identifier, prohibits relaying of the frame toward the relay-destination port.

3. The communication system according to claim 2,
wherein each of the first and second switch devices is a box-type switch device.

4. A network relay device comprising:
a plurality of ports including first and second ports;
a bridge port for connecting to another network relay device via a communication line;
a relay condition defining prohibition of relaying of a frame from a predetermined relay-source port to a predetermined relay-destination port among the plurality of ports; and
a link table showing that link aggregation is set for the first port of the network relay device and a first port of the another network relay device and that link aggregation is set for the second port of the network relay device and a second port of the another network relay device;
wherein, if the first and second ports of the another network relay device have no link failure, forwarding of the frame, which has been received by the bridge port, from the first and second ports of the network relay device is prohibited;
if the second port of the another network relay device has a link failure, forwarding of the frame, which has been received by the bridge port, from the second port of the network relay device is permitted;
if the first port of the network relay device receives the frame, a port identifier is added to the frame, the port identifier representing a port of the plurality of ports of the network relay device that received the frame, and the frame is forwarded from the bridge port of the network relay device;
if the frame to which the port identifier is added by the another network relay device is received by the bridge port of the network relay device, the port identifier is detected from the frame, and, if the relay-source port of the relay condition is the port represented by the port identifier, relaying of the frame toward the relay-destination port is prohibited.

5. The network relay device according to claim 4,
wherein the plurality of ports further include a general port for which link aggregation is not set;
if the frame is received by the general port, a port identifier representing the received port is added to the frame and the frame is forwarded from the bridge port of the network relay device; and,
if the frame to which the port identifier is added by the another network relay device is received by the bridge port of the network relay device, the port identifier is detected from the frame, and, if the relay-source port having the relay condition is the port represented by the port identifier, relaying of the frame toward the relay-destination port is prohibited.

* * * * *